United States Patent [19]

Meyerle et al.

[11] 4,291,592
[45] Sep. 29, 1981

[54] LOAD SPLITTING HYDROMECHANICAL TRANSMISSION

[75] Inventors: Michael Meyerle, Meckenbeuren-Lochbrücke; Friedrich Ehrlinger, Friedrichshafen, both of Fed. Rep. of Germany

[73] Assignee: Zahnradfabrik Friedrichshafen Aktiengesellschaft, Friedrichshafen, Fed. Rep. of Germany

[21] Appl. No.: 967,006

[22] Filed: Dec. 6, 1978

[30] Foreign Application Priority Data

Dec. 29, 1977 [DE] Fed. Rep. of Germany ....... 2758659

[51] Int. Cl.³ .............................................. F16H 47/04
[52] U.S. Cl. ....................................... 74/687; 74/768
[58] Field of Search ................... 74/687, 720.5, 690, 74/768

[56] References Cited

U.S. PATENT DOCUMENTS

| | | | |
|---|---|---|---|
| 3,884,095 | 5/1975 | Miyao et al. | 74/687 |
| 3,969,957 | 7/1976 | DeLalio | 74/687 |
| 3,979,972 | 9/1976 | Sakai et al. | 74/687 |
| 4,164,156 | 8/1979 | Reed | 74/687 |

*Primary Examiner*—C. J. Husar
*Assistant Examiner*—Frank McKenzie
*Attorney, Agent, or Firm*—Karl F. Ross

[57] ABSTRACT

A hydromechanical drive has an input shaft connected permanently to the input of a variable-volume hydraulic pump and to the planet carrier of a summing transmission. The pump in turn drives a motor which in turn rotates the sun gear of this summing transmission, which has a first planet gear meshing with the sun gear and with a respective ring gear and a second planet gear meshing with the first planet gear and with a respective ring gear. A planetary-gear output transmission has its planet carrier connected to the ring gear of the second planet gear of the summing transmission and a planet carrier connected permanently to the output shaft of the drive and connectable through an openable clutch to the ring gear of the first planet gear of the summing transmission. In addition this output transmission has a first planet gear meshing with the respective sun gear and with a respective ring gear and a second planet gear meshing with the respective first planet gear and with its own ring gear. Brakes can arrest either of the ring gears of the output transmission. This output transmission can be replaced by a constant-mesh stepdown gear box. Thus the force applied to the input shaft of the transmission is split up and fed to the summing transmission in part directly and mechanically and in part through the hydrostatic transmission formed by the pump and the motor.

7 Claims, 3 Drawing Figures

LOAD SPLITTING HYDROMECHANICAL TRANSMISSION

FIELD OF THE INVENTION

The present invention relates to a hydromechanical transmission. More particularly this invention concerns such a transmission of the load-splitting type usable in a piece of heavy-duty equipment, such as a crane or tractor.

BACKGROUND OF THE INVENTION

The prime mover or engine of a heavy piece of construction equipment or the like normally has an output that rotates at a constant speed or whose speed at best can be varied within a predetermined relatively small range. Thus it is standard practice to provide a variable-speed drive between the output of such a prime mover and the load to be operated, which can be the wheels of the vehicle, a winch, or another peripheral apparatus.

A hydromechanical transmission is described in S.A.E. Publication 72 07 24 of September 1972. It has two forward speeds and a reverse speed, and comprises a hydraulic transmission and mechanical transmission. The hydraulic transmission comprises a pair of hydraulic machines, a pump and a motor, one of which is of variable volume. The mechanical transmission comprises a four-shaft planetary-gear transmission. This arrangement is set up for load splitting so that it is possible with a limitedly variable or even fixed speed of the input shaft of the drive to obtain a steplessly variable speed at the output shaft.

In this arrangement in the low forward speed and in reverse the drive is purely hydrostatic, that is there is actually no load splitting and all of the force transmitted from the input shaft to the output shaft of the drive is transmitted through the hydrostatic pump-and-motor assembly. Obviously the force-transmitting capacity of such a drive is limited at least in these two low-speed ranges by the capacity of the hydrostatic assembly.

Thus it is necessary in such a system either to provide it with an extremely heavy-duty pump-and-motor assembly, or to reduce the maximum speed both in forward low gear and reverse gear so that the product of speed times torque, which determines the drive capacity, remains low and within the range of the hydrostatic subassembly. For this reason the drive will either be quite expensive as a result of having a very large hydrostatic pump-and-motor assembly, or will only provide a very slow low gear and reverse.

Another disadvantage of this system is that the vehicle jumps when started in forward and reverse. This action is the result of the inertia of the pump-and-motor assembly. An axial-piston pump is normally employed and is normally constantly driven by the input shaft of the transmission. Thus when the output shaft of the drive should stand still the swash plate of the pump is aligned perpendicular to the axis of the pump so that even though the pump is driven by the input shaft, it will not act as a pump and the motor of the hydrostatic subassembly will not operate. Only when the swash plate has been tipped through a relatively great angle will the inertia of the motor be overcome so that it will start rotating and, hence, will drive the output shaft. As a result jumpy starting and stopping is taken for granted with such a drive.

OBJECTS OF THE INVENTION

It is therefore an object of the present invention to provide an improved hydromechanical drive.

Another object is to provide a drive of the above-described type, which can be produced at relatively low cost and which will provide relatively high output speed and high torque in all transmission ranges.

A further object is to provide such a drive whose output shaft can be started smoothly and gently from standstill.

Another object is to provide an improved method of operating such a drive.

SUMMARY OF THE INVENTION

These objects are attained according to the instant invention in a drive of the above-described general type, but comprising a gear-type summing or load-splitting transmission having one input element connected to the output side of the hydrostatic transmission, another input element connected mechanically to the input shaft of the transmission, and at least one output element. In accordance with the instant invention in all ranges and at any output speed the force being applied to the input shaft of the drive is split and is fed in part through the hydrostatic transmission and in part directly to the summing transmission, so that at no time need the hydrostatic transmission carry the entire load.

According to this invention the hydromechanical drive further comprises an output transmission having at least one output element connected directly to the output shaft and a pair of input elements which can be connected to the output elements of the summing transmission. Thus the force applied to the input shaft of the drive is first of all split and passed in part through the hydrostatic transmission, then recombined in the summing transmission, and thereafter applied to the output transmission which can step it up or down as required by the particular machine using the drive.

This system can therefore provide a steplessly variable output speed across all its ranges. At the same time the load-transmitting capacity of the hydrostatic transmission need not be more than approximately half, and normally not more than one-third, of the overall force-transmitting capacity of the drive. As a result it is possible to reduce the drive size and cost greatly, without in any way sacrificing capacity or versatility.

In fact it is possible to operate the system according to the instant invention so that in a neutral mode or gear when the input shaft is being driven and the output shaft is at standstill the entire hydrostatic transmission, including the motor thereof, is operating at a relatively high speed, driving the respective input element of the summing transmission in one direction while the input shaft of the transmission drives the other input element of the summing transmission in the opposite direction so that the two motions are canceled out. As a result the entire hydrostatic transmission is in motion when the vehicle is to be started, so that a gentle start is possible, allowing the operator of a piece of equipment having such a drive to control his or her piece of equipment with an extremely fine touch, thereby avoiding potentially costly and dangerous accidents.

According to another feature of the instant invention the output transmission has a pair of output elements one of which turns in a direction opposite the other no matter which one of the input elements of the output transmission is driven. According to this invention the control means can switch between these output elements so as to rotate the output shaft in either direction, thereby producing in a very simple manner a reverse gear. All of the above-described advantages applying to the first gear, that is the use of the load-splitting so that a relatively small hydrostatic assembly can be employed, are present in this reverse gear.

According to further features of this invention the output transmission is of the planetary type and has a sun gear constituting one of its input elements, a planetary carrier constituting the other of its input elements, a first planetary gear meshing with the sun gear and constituting one of its output elements, and a second planetary gear meshing with the first planetary gear—but not with the sun gear—and constituting the other of its output elements, and a pair of independently rotatable ring gears each meshing with a respective one of the planet gears. The control means includes brakes for the ring gears. According to this invention the one brake is closed and the other brake is open for low-range forward travel and for reverse travel the one brake is closed and the other brake is open.

In accordance with this invention the control means further includes a clutch which connects the planet carrier of the output-transmission to one of the output elements of the summing transmission, the sun gear of this output transmission being connected to the other output element of the summing transmission. Thus for high-range forward travel the clutch is closed, thereby connecting the drive shaft directly to the output transmission planet carrier which in turn is connected to the other output element of the summing transmission. In this position the second or output transmission is virtually ineffective, as the two ring gears are allowed to rotate freely relative to each other so that even though the sun gear is still being driven by the one output element of the summing transmission the planet carrier can rotate freely in either direction. The direction of rotation of the planet carrier is, of course, determined by the other output element of the summing transmission.

In accordance with yet another feature of this invention the summing transmission is itself a four-shaft planetary gear transmission, having a sun gear continuously driven by the output of the hydrostatic transmission and a planet carrier continuously driven by the input shaft of the transmission. This planet carrier in turn carries a pair of planet gears, one of which meshes with the respective sun gear and the other of which does not mesh with the sun gear but only meshes with the other planet gear. Ring gears each meshing with a respective one of the planet gears constitute the two output elements. As mentioned above the one ring gear is connectable via the clutch to the planet carrier of the output transmission and the other ring gear is permanently connected to the sun gear of the output transmission.

It is also possible in accordance with this invention to provide simple stepdown gearing at the output transmission. In this case the output shaft can be connected to any of several pinions. One of thse pinions is continuously driven by the one output element of the summing transmission, another of these pinions is connected to the other output of the summing transmission, and yet another of these pinions is connected with a reversing gear to this other output of the summing transmission. Connection to the third-mentioned pinion is made for reverse gear, whereas connection to the others is made for low range and high range.

It is also within the scope of this invention to provide a clutch or other connection which directly and positively couples the output shaft of the drive to the input shaft thereof. When such a connection is made the lines interconnecting the hydraulic pump and motor are shunted out so as to effectively be depressurized, thereby avoiding strain of the system.

The system according to the present invention can be made very compact. The use of planetary gearing furthermore allows a concentric arrangement of the various devices and gears so that a relatively vibration-free assembly can be produced. What is more the start-up force can be reduced by approximately 15%, as the system is operated so that the pump and motor can operate at relatively high speed while the output shaft remains at a standstill.

SPECIFIC DESCRIPTION

Figure 1:
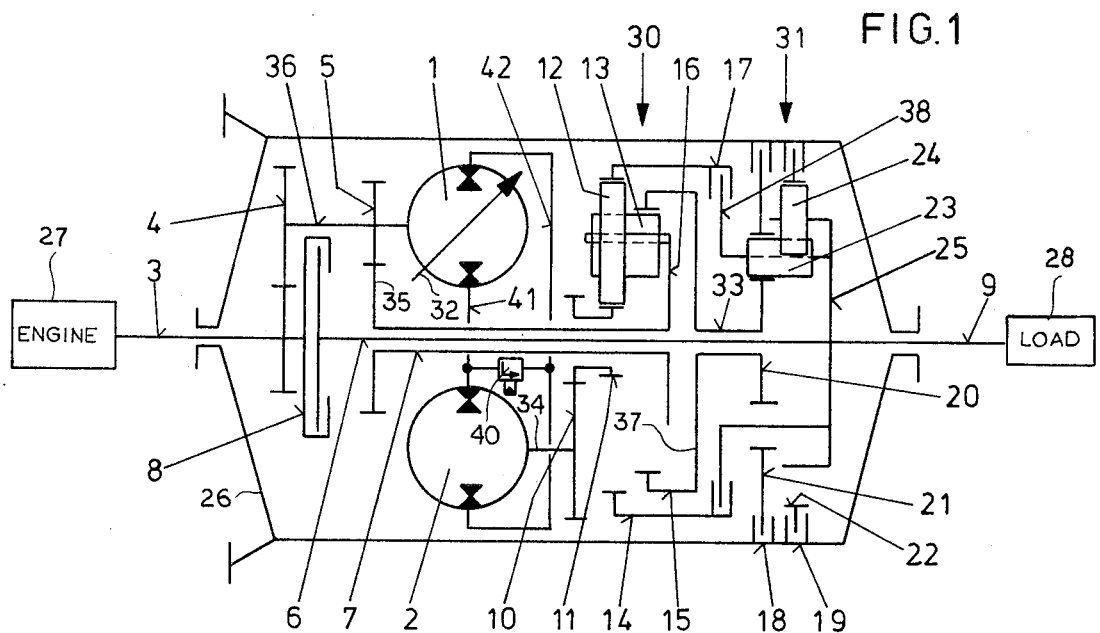
FIG. 1 is a schematic view of the drive according to the instant invention.

As shown in FIG. 1 a drive 1 according to this invention basically comprises a housing 26 in which an input shaft 3 and a coaxial output shaft 9 are journaled. An engine 27, normally of the diesel type, is connected to the input shaft 3 and a load 28, normally constituted by the wheels of a vehicle, is connected to the shaft 9.

The shaft 3 carries an input gear that meshes with a first satellite gear 4 carried on a shaft 36 parallel to the shaft 3. The other end of this shaft 36 serves to drive a variable-volume axial-piston pump 1 having a control element or swash plate indicated schematically at 32. This pump 1 is connected via hydraulic lines 41 and 42 to a fixed-volume hydraulic motor 2 having an output element 34 carrying a gear 10 that meshes with and drives a sun gear 11 of a planetary-gear summing or load-adding transmission 30.

Also carried on the shaft 36 is a gear 5 that meshes with a gear 35 carried on a tube shaft 7 coaxial with the shafts 3 and 9 and carrying at its opposite end the planet carrier 16 of the transmission 30. Thus as the engine 27 rotates the input shaft 3 the pump 1 will be continuously driven and the planet carrier 16 will also be continuously driven. The speed at which the sun gear 11 is driven is, however, determined by the position of the control element 32.

The summing or load-adding transmission 30 comprises at least two planet gears 12 and 13. The planet gear 12 meshes with the sun gear 11 and with a ring gear 14. The planet gear 13 meshes with the planet gear 12 and with a ring gear 15. Thus the gears 12 and 13 will always rotate in opposite directions.

The output shaft 9 is permanently and rigidly connected to a planet carrier 25 of an output transmission 31 having a sun gear 20 connected via a tube shaft 33 and element 37 to the ring gear 15 of the planet gear 13. This planet carrier 25 is also connected at 38 to one side of a clutch 17 connected to the ring gear 14 of the planet gear 12. The planet carrier 25 carries a planet gear 23 meshing with the sun gear 20 and a planet gear 24 meshing with the planet gear 23 so that once again the planet gears 23 and 24 will rotate in opposite directions. Finally the transmission 31 includes ring gears 21 and 22 respectively meshing with the planet gears 23 and 24. Brakes 18 and 19 on the housing 26 can arrest the respective ring gears 21 and 22.

In addition the input shaft 3 carries on its end remote from the engine 27 a clutch 8 that can be connected via an intermediate shaft 6 directly with the output shaft 9. This shaft 6 passes concentrically and coaxially through the tube shafts 7 and 33.

Figure 2:
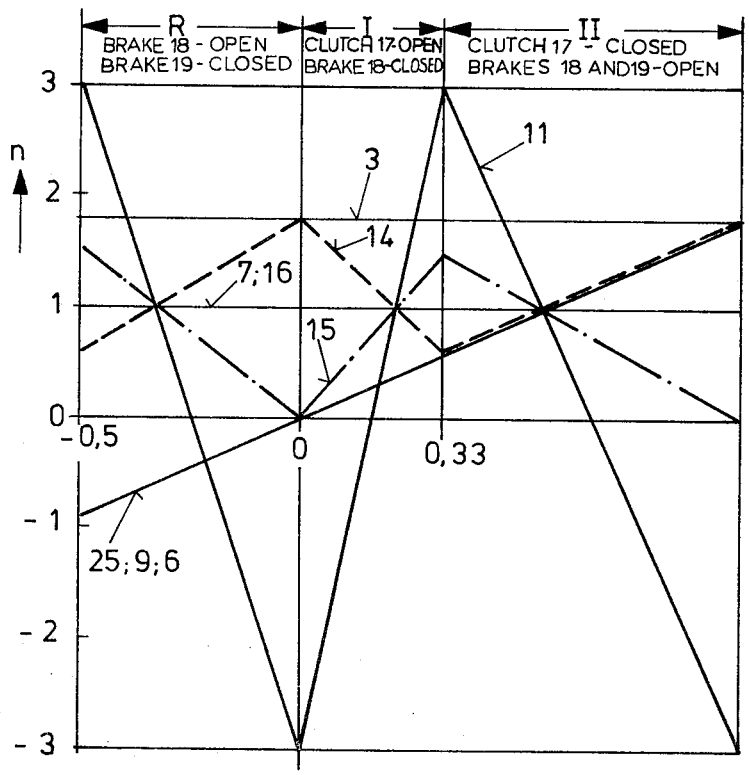
FIG. 2 is a diagram illustrating the operation of the drive of FIG. 1.

The above-described drive operates in the manner shown in FIG. 2, wherein displacement speed for a vehicle embodying the drive is shown on the abscissa and the rotational speeds for the various elements of the drive are shown on the ordinate. The drive can be shifted from a first range I for low speed and starting to a second range II for high speed travel and into a reverse gear R. As illustrated on the graph, the input shaft 3 normally rotates at a continuous speed, so that the tube shaft 7 and planet carrier 16 are also continuously rotated at a constant speed. For travel in the low range I the clutch 17 is open to disconnect the planet carrier 25 from the ring gear 14, the brake 18 is closed to arrest the ring gear 21, and the brake 19 is open to allow free rotation of the ring gear 22. To hold the output shaft 9 at a standstill it is necessary that the sun gear 20, and hence the ring gear 15, be stationary, as when the sun gear 20 rotates, the planet gears 23 will be forced to orbit and the planet carrier 25 will turn. This standstill is achieved by high-speed reverse rotation of the pump 1 through appropriate backward tilting of its control element 32 so that although the planet carrier 16 is being driven in one direction, the sun gear 11 will be rotated in the opposite direction, having the net effect of orbiting the planet gear 13 around inside the ring gear 15 without rotating this ring gear 15. This action will rotate the ring gear 14 at relatively high speed, which will have no effect on the transmission as the ring gear 14 is not connected by the clutch 17 to any other parts.

Swinging the swash plate 32 forwardly into a neutral position will start rotating and smoothly increase the rotation speed of the ring gear 15, and hence will start to rotate the output shaft 9. As this output shaft 9 is connected via the planet carrier 25 and inner planet gear 23 to the sun gear 20 the rate of increase of its rotational speed will be much less than that of the ring gear 15 which in turn is much less than that of the sun gear 11 directly driven by the motor 2. In fact when the motor 2 is at a complete standstill, with the swash plate 32 lying perpendicular to the rotation axis of the axial-piston pump 1, a vehicle or other load being operated by the drive will already be moving. Forward displacement of the swash plate 32 past the stasis point will smoothly and continuously increase the rotation speeds of the sun gear 15 and of the output shaft 9 while similarly decreasing the rotation speed of the ring gear 14.

Once the swash plate 32 is all the way over forward, an automatic controller will simultaneously close the clutch 17 and open the brake 18, so that both the ring gears 21 and 22 can turn freely in the housing 26 but the output shaft 9 will be directly coupled through the planet carrier 25 to the ring gear 14. The various gear ratios and speeds are, of course, such that at this changeover point the two sides of the clutch 17 are moving synchronously and there is very little angular force effective on the ring gear 21, so that the gear change can be effected almost imperceptibly and with no appreciable wear of any parts of the drive. To increase the speed in range II the swash plate 32 is moved from the full forward position back through the neutral position into the full back position as shown in FIG. 2. The concomittant result of this is a simultaneous and parallel increasing of the rotation speeds for the output shaft 9 and the ring gear 14 coupled directly to it. At the same time the rotation speed of the gear 15 will steadily decrease, but since the two ring gears 21 and 22 can rotate freely in the housing 26 this has no effect on the operation of the transmission. Assuming the maximum output speed of the transmission to be 1.0 the switchover point lines approximately one-fourth of the way between the stopped position and the maximum speed position.

As shown in the graph of FIG. 2 at maximum speed in range II the input shaft 3 and the output shaft 9 are rotating synchronously. At this time the clutch 8 can be closed and a pressure-regulating openable valve 40 between the lines 41 and 42 may be opened to depressurize hydraulic subassembly 1, 2. Thereafter the speed of engine 27 will directly determine the speed of shaft 9. Such a system is used for running on the highways, or lifting a relatively light load with minimum drive wear.

When the vehicle is stopped, that is with the swash plate 32 all the way back so that the output shaft 9 is arrested, the drive is placed in reverse simply by closing the brake 19, with the brake 18 being left open and the clutch 17 left disengaged. As the swash plate 32 is then moved back into the forward position the action will be substantially identical to that for range I, except that a speed reversal for the shaft 9 will be effected through interposition of the second gear 24 in the drive. As a result the shaft 9 will rotate backwardly at an ever increasing rate with the forward tipping of the swash plate 32, while the ring gear 15 will rotate faster at a greater slope than that of the shaft 9, but at a slope still considerably less than that of the increase in speed of the sun gear 11 as determined by the position of the swash plate 32. The gear 24 is larger in diameter than the gear 23 so that range R has a maximum speed which is somewhat greater, equal to approximately half of the maximum speed in range II, than the maximum speed in the range I in the forward direction.

It is noted that the various controls can all easily be operated through a single lever. A crank-type cam can operate the swash plate 32 with appropriate switches or valves controlling the opening and closing of the clutch 17 and brakes 18 and 19.

Figure 3:
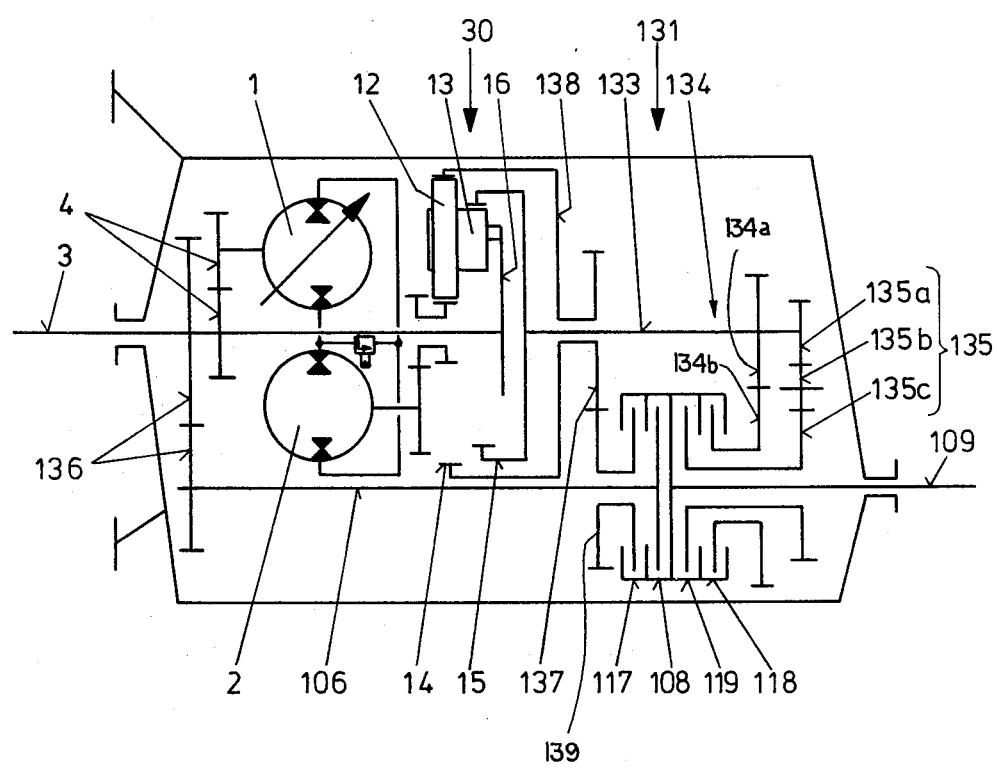
FIG. 3 is a schematic view of another drive according to this invention.

The arrangement of FIG. 3 is functionally identical to that of FIG. 1, except that the transmission 31 is replaced by a stepdown continuous-mesh transmission 131. To this end the ring gear 14 is connected via an element 138 to a gear 137 itself meshing with a pinion 139 carried on a shaft 106 offset from the shaft 3. The ring gear 15 is connected via an extension shaft 133 to a pair of pinions 134a and 135a. The pinion 134a in turn meshes with another pinion 134b forming the second half of a two-part gear train 134 and the pinion 135a meshes with another pinion 135b itself meshing with yet another pinion 135c forming a three-part gear train 135. An output shaft 109 can be connected via a clutch 117 to the pinion 139, via a clutch 119 to the pinion 134b and via a clutch 118 to the pinion 135c.

In addition the shaft 106 is connected via gears 136 directly to the input shaft 3 and another clutch 108 can lock the shafts 106 and 109 together.

In the arrangement of FIG. 3 low-speed first-gear travel is obtained by closing the clutch 118, second-gear forward travel is obtained by closing the clutch 117 with the clutches 118 and 119 open. Reverse gear is obtained by closing the clutch 119. Finally direct coupling of the shafts 106 and 109 is possible with the clutch 108. The transmission 131 of FIG. 3 can be provided in the drive of FIG. 1 for a variable-speed power takeoff if desired. Once again the various gear ratios and changeover points are calculated so that when two parts are coupled together by a clutch they are moving synchronously.

I claim:

1. A hydromechanical drive comprising:
   an input shaft drivable by a prime mover;
   an output shaft connectable to a load;
   a hydrostatic transmission having an input side connected to said input shaft and an output side and comprising a pair of hydraulically interconnected hydraulic machines one of which is of variable volume to vary the transmission ratio between said input and output sides;
   a gear-type summing transmission having one input element connected to said output side of said hydrostatic transmission, another input element connected mechanically to said input shaft, and a pair of output elements;
   an output transmission having at least one output element mechanically connected to said output shaft and a pair of input elements; and
   control means connected to said output transmission and the elements thereof and connectable to said output elements of said summing transmission for operating said output element of said output transmission through one of said input elements of said output transmission and one of said output elements of said summing transmission in a first position and for operating said output element of said output transmission through the other of said input elements of said output transmission and the other of said output elements of said summing transmission in a second position.

2. A hydromechanical drive comprising:
   an input shaft drivable by a prime mover;
   an output shaft connectable to a load;
   a hydrostatic transmission having an input side connected to said input shaft and an output side and comprising a pair of hydraulically interconnected hydraulic machines one of which is of variable volume to vary the transmission ratio between said input and output sides;
   a gear-type summing transmission having one input element connected to said output side of said hydraulic transmission, another input element connected mechanically to said input shaft, and a pair of output elements;
   an output transmission having a pair of output elements mechanically connectable to said output shaft and a pair of input elements, one of said output elements of said output transmission turning in a direction opposite the other output element of said output transmission; and
   control means connected to said output transmission and the elements thereof and connectable to said output elements of said summing transmission for operating said output elements of said output transmission through one of said input elements of said output transmission and one of said output elements of said summing transmission in a first position and for operating said output elements of said output transmission through the other of said input elements of said output transmission and the other of said output elements of said summing transmission in a second position, whereby when said output shaft is connected by said control means to said one output element of said output transmission it rotates in one direction and when connected to said other output element of said output transmission it rotates in the opposite direction.

3. The drive defined in claim 2 wherein said output transmission is of the planetary type and has a sun gear constituting one of its input elements, a planetary carrier constituting the other of its input elements, a first planetary gear meshing with said sun gear and constituting one of its said output elements, a second planetary gear meshing with said first planetary gear and constituting the other of its said output elements, and a pair of independent ring gears each meshing with a respective one of said planet gears of said output transmission, said control means including brakes for said ring gears.

4. The drive defined in claim 3 wherein said control means further comprises a clutch for connecting said planetary carrier to one of said output elements of said summing transmission.

5. The drive defined in claim 2 wherein said output transmission includes two trains of gears each having one terminal gear constituting a respective output element of said output transmission and one of said trains having an odd number of gears while the other has an even number.

6. A hydromechanical drive comprising:
   an input shaft drivable by a prime mover;
   an output shaft connectable to a load;
   clutch means for directly and positively connecting said input shaft to said output shaft;
   a hydrostatic transmission having an input side connected to said input shaft and an output side and comprising a hydraulic motor machine and a hydraulic pump machine connected hydraulically thereto, one of said machines being of variable volume to vary the transmission ratio between said input and output sides, said hydrostatic transmission further comprising lines interconnecting said pump and motor machines and means for interconnecting said lines and thereby depressurizing same when said clutch means has positively connected said shafts together;
   a gear-type summing transmission having one input element connected to said output side of said hydrostatic transmission, another input element connected mechanically to said input shaft, and a pair of output elements;
   an output transmission having at least one output element mechanically connected to said output shaft and a pair of input elements; and
   control means connected to said output transmission and the elements thereof and connectable to said output elements of said summing transmission for operating said output element of said output transmission through one of said input elements of said output transmission and one of said output elements of said summing transmission in a first position and for operating said output element of said output transmission through the other of said input elements of said output transmission and the other of said output elements of said summing transmission in a second position.

7. A method of operating a hydromechanical drive having
   an input shaft drivable by a prime mover;
   an output shaft connectable to a load;

a hydrostatic transmission having an input side connected to said input shaft and an outputside and comprising a hydraulical pump machine and a hydraulic motor machine connected hydraulically thereto, one of said machines being of variable volume to vary the transmission ratio between said input and output sides; and a gear-type summing transmission having one input element connected to said output side of said hydrostatic transmission, another input element connected mechanically to said input shaft, and at least one output element, said method comprising the steps of:

driving said output shaft with said output element;

varying the volume of said one hydraulic machine to vary the speed of said output shaft; and operating said motor machine in a neutral mode at a relatively high speed to drive said one input element in one direction while driving said other input element with said input shaft in the opposite direction at such rates that said output shaft does not rotate.

* * * * *